United States Patent [19]

Romero

[11] 4,124,241

[45] Nov. 7, 1978

[54] NON-FERROUS PITCHFORK FOR USE IN SILO

[76] Inventor: Anthony P. Romero, 515 Julian St., Denver, Colo. 80204

[21] Appl. No.: 810,796

[22] Filed: Jun. 28, 1977

[51] Int. Cl.² .......................... A01B 1/20; A01D 9/00
[52] U.S. Cl. ...................................... 294/51; 294/55.5
[58] Field of Search ........................ 294/49, 50, 51, 52, 294/55.5, 61, 120, 121; 7/1 L; 30/322; 76/111; 172/371, 378, 380; 175/394

[56] References Cited

U.S. PATENT DOCUMENTS

| | | | |
|---|---|---|---|
| 18,670 | 11/1857 | Barton et al. | 294/55.5 |
| 68,352 | 9/1867 | Clow | 294/55.5 |
| 310,958 | 1/1885 | Noyes | 294/52 |
| 571,205 | 11/1896 | Sorenson | 294/55.5 |
| 792,350 | 6/1905 | Robison | 294/55.5 |
| 2,028,483 | 1/1936 | Van Yahres | 294/51 X |
| 3,108,426 | 10/1963 | Rugg | 294/49 X |

*Primary Examiner*—Johnny D. Cherry
*Attorney, Agent, or Firm*—Clarence A. O'Brien; Harvey B. Jacobson

[57] ABSTRACT

A pitchfork for use in silos, and the like, where bulk material, such as grain, has become compacted due to exposure to moisture has a tine portion and a shank portion, with the former being constructed from a non-ferrous material which prevents creation of sparks when the tine portion strikes the compacted bulk material within the silo.

1 Claim, 6 Drawing Figures

U.S. Patent  Nov. 7, 1978  4,124,241
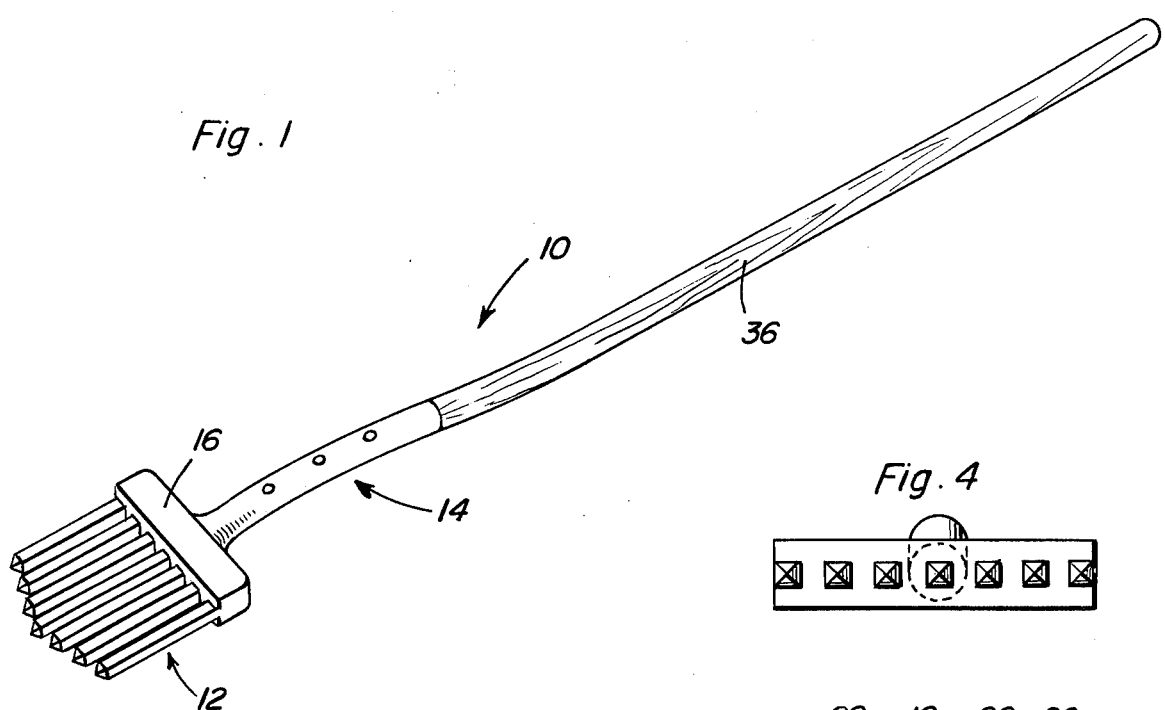
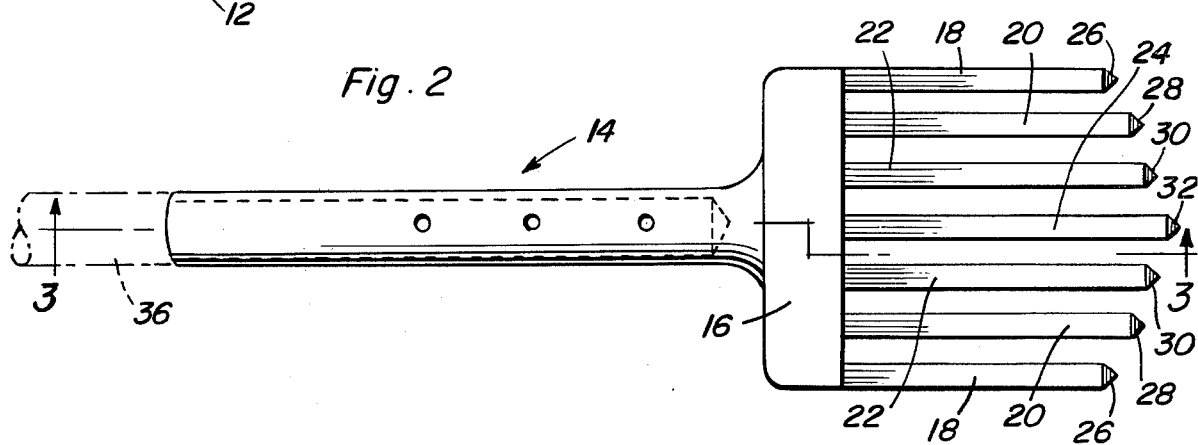
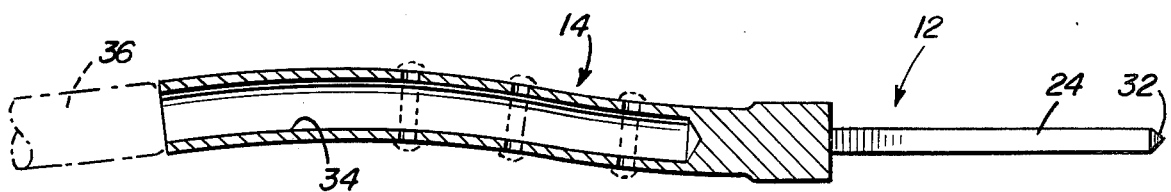
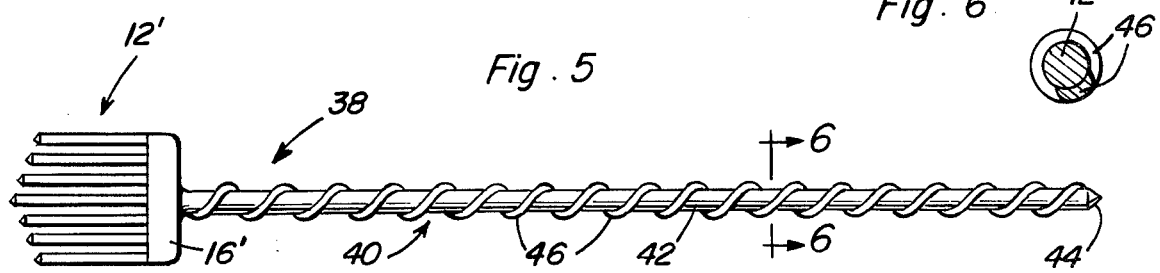

NON-FERROUS PITCHFORK FOR USE IN SILO

BACKGROUND OF THE INVENTION

1. Field of the Invention

This invention relates generally to tools for working bulk material, such as grains, and particularly to a pitchfork constructed from a non-ferrous material and provided with features which facilitate working of compacted grain within a silo, and the like, in an efficient and safe manner.

2. Description of the Prior Art

A problem encountered with grains stored in silos is that since the silo does not have a controlled environment, moisture resulting from high humidity, for example, within the silo will cause the grain to harden and become concrete-like. As a result, a buildup of static electricity can be present in the compacted grain, and striking of the grain with a conventional pitchfork or other suitable tool constructed from iron or steel will cause a spark to be generated within the silo which may be discomfiting and possibly even dangerous to the individual manipulating the pitchfork.

A problem related to that discussed above is that the pitchfork often has difficulty in penetrating the compacted material. As regards this problem, it has been proposed, as in U.S. Pat. No. 806,042, issued Nov. 28, 1905 to J. M. Wolfe, having a central piercing-tine which extends a much greater distance from a shank of the fork than do tines or prongs flanking the central tine. Further, U.S. Pat. No. 3,020,077, issued Feb. 6, 1962 to L. J. Rokos, discloses a round mouthed shovel having notches provided in the front, rounded edge thereof so as to effectively form a plurality of tines, the center one of which tines is longer than the flanking ones.

SUMMARY OF THE INVENTION

It is an object of the present invention to provide a pitchfork, or similar tool, which can be safely used for working compacted grain, and the like, in a silo or similar container without danger of creating sparks.

It is another object of the present invention to provide a pitchfork which will more effectively work compacted grain, and the like.

It is yet another object of the present invention to provide a pitchfork, or similar tool, which is provided with means for more effectively dislodging compacted grains than the tines of a pitchfork.

These and other objects are achieved according to the present invention by providing a pitchfork having: a tine portion and a shank portion, with the former being constructed from a non-ferrous material for preventing creation of sparks when the tine portion strikes compacted bulk makterial in a silo, or other suitable container.

The tine portion of the pitchfork preferably includes a base and a plurality of substantially parallel tines extending codirectionally from the base. The tines terminate in free ends which define a concave surface open toward the base. That is, the centralmost of the tines is longer than the other of the tines, with the tines decreasing progressively in length from the central tines to the outermost of the tines.

Each of the tines advantageously has a substantially square cross section, with the free end thereof being pyramidal in shape to facilitate penetration of the tine into compacted bulk material.

While the shank portion of a pitchfork according to the invention can define a socket for receiving a conventional wooden handle, and the like, the shank portion may itself form a handle terminating in a pointed tip spaced from the tine portion. A flute provided on the handle forms an auger for dislodging compacted bulk material prior of penetration of the bulk material with the tines of the fork portion of the implement.

These, together with other objects and advantages which will become subsequently apparent, reside in the details of construction and operating as more fully hereinafter described and claimed, reference being had to the accompanying drawings forming a part thereof, wherein like numerals refer to like parts throughout.

BRIEF DESCRIPTION OF THE DRAWINGS

FIG. 1 is a perspective view showing a preferred embodiment of a pitchfork according to the present invention.

FIG. 2 is an enlarged, top plan view showing the pitchfork of FIG. 1.

FIG. 3 is a sectional view taken generally along the line 3—3 of FIG. 2.

FIG. 4 is a front elevational view showing the pitchfork of FIGS. 1-3.

FIG. 5 is a plan view showing a second embodiment of a pitchfork according to the present invention.

FIG. 6 is an enlarged, sectional view taken generally along the line 6—6 of FIG. 5.

DESCRIPTION OF THE PREFERRED EMBODIMENTS

Referring now more particularly to the embodiment of the invention shown in FIGS. 1-4 of the drawings, a pitchfork 10 for use in silos, and the like, includes a tine portion 12 and a shank portion 14. Tine portion 12 is constructed from a suitable non-ferrous material for eliminating sparks which may be created when the tine portion of a pitchfork constructed from a ferrous material strikes compacted bulk material (not shown) such as a conventional grain, stored in a silo so as to be subjected to moisture due to excessive humidity, and the like.

While bronze is contemplated for use as the material from which tine portion 12, and also shank portion 14, are advantageously constructed, it is to be understood that other non-ferrous materials may be employed as economics warrant. For example, it may be economically feasible to employ a compound of lead and a suitable synthetic resin in place of bronze as the material from which pitchfork 10 is constructed.

Tine portion 12 includes a longitudinally extending, rectangular, base 16 and a plurality of substantially parallel tines 18, 20, 22, and 24 extending codirectionally from base 16. As can be seen from FIGS. 1 and 2, the tines 18 are shorter than the tines 20 adjacent thereto, the tines 22 extend a greater distance from base 16 than the tines 20 adjacent thereto, and the single tine 24 centrally disposed along base 16 extends a greater distance from base 16 than any of the other tines. By this arrangement, the tines 18, 20, 22 and 24 define a concave surface open toward base 16 so as to facilitate penetration, as by the single tine 24, into a compacted material.

Each of the tines 18, 20, 22 and 24 has a substantially rectangular, preferably square, cross section, with the free end 26, 28, 30 and 32, respectively, of the tine being pyramidal in shape to facilitate initial penetration into concrete-like bulk material.

Shank portion 14 is affixed, and preferably unitized therewith as a single piece, to base 16, and extends therefrom in the opposite direction as the tines 18, 20, 22 and 24. Shank portion 14 is provided with an elongated socket arranged for movably receiving an end portion of the longitudinally extending handle 36. Suitable rivets, screw fasteners, and the like, are disposed passing through shank portion 14 and that part of handle 36 disposed within socket 34 for retaining handle 36 within socket 34.

Referring now more particularly to FIGS. 5 and 6 of the drawing, a pitchfork 38 according to the present invention includes in addition to a tine portion 12' having a base 16', a shank portion 40 affixed to base 16' and extending longitudinally therefrom in the opposite direction of the tines of tine portion 12'. This shank portion 40 forms a longitudinally extending handle 42 terminating in a pointed tip 44 spaced longitudinally from the tine portion 12. A continuous flute 46 is provided extending spirally along the longitudinal extent of handle 42 so as to form an auger for dislodging compacted bulk material. In this manner, a rotating movement of handle 42, as facilitated by base 16', about the longitudinal axis of handle 42 will result in the bulk material being loosened prior to prevention thereof by the tine portion 12', thus realizing an additional efficiency is working the concrete-like grain.

In addition to the use of a non-ferrous material such as bronze preventing creation of sparks which may cause fire within the bulk material and associated silo, the use of such a heavy non-ferrous material as bronze or a lead compound will cause the pitchfork to be heavier than a conventional pitchfork, which increased density is advantageous because the extra weight is helpful in sinking the fork into the compacted grain or other bulk material.

As can be understood from the above description and from the drawings, a pitchfork according to the present invention greatly facilitates working of compacted bulk materials, such as grain and unlined silos and similar structures. The use of a non-ferrous material will prevent static discharge from the compacted bulk material, while the particular configuration of the tines, as well as the possible use of an auger handle, make possible dislodgment of the compacted material in a more efficient manner.

The foregoing is considered as illustrative only of the principles of the invention. Further, since numerous modificatons and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A pitchfork for use in silos, comprising a tine portion and a shank portion, the former being constructed from a non-ferrous heavy metal having a high density for preventing creation of sparks when the tine portion strikes a compacted bulk material disposed in the silo and adding extra weight helpful in sinking the fork into compacted material, the tine portion including a base and a plurality of substantially parallel, straight tines extending codirectionally from the base, the tines being of different lengths terminating in free ends defining a concave arc opening toward the base of the tine portion, each of the tines having a substantially square cross section, with the free end thereof being pyramidal in shape for facilitating penetration of the tine into the compacted bulk material, the shank portion being integral with the tine portion, and forming a handle as a rigid extension of the tine portion terminating is a pointed tip spaced from the tine portion, and a continuous flute provided on and extending spirally along the longitudinal extent of the handle for forming an auger means arranged for dislodging the compacted bulk material prior to penetration of the material by the tine portion.

* * * * *